April 4, 1961

R. C. BIERMAN 2,978,198

DRIVE FOR TAPE RECORDER

Filed June 16, 1958

INVENTOR.

Raymond C. Bierman

By: Mueller & Aichele

Attys.

United States Patent Office 2,978,198

Patented Apr. 4, 1961

2,978,198

DRIVE FOR TAPE RECORDER

Raymond C. Bierman, Clarendon Hills, Ill., assignor to Motorola, Inc., Chicago, Ill., a corporation of Illinois Filed June 16, 1958, Ser. No. 742,079

6 Claims. (Cl. 242—55.12)

Figures 1, 2:
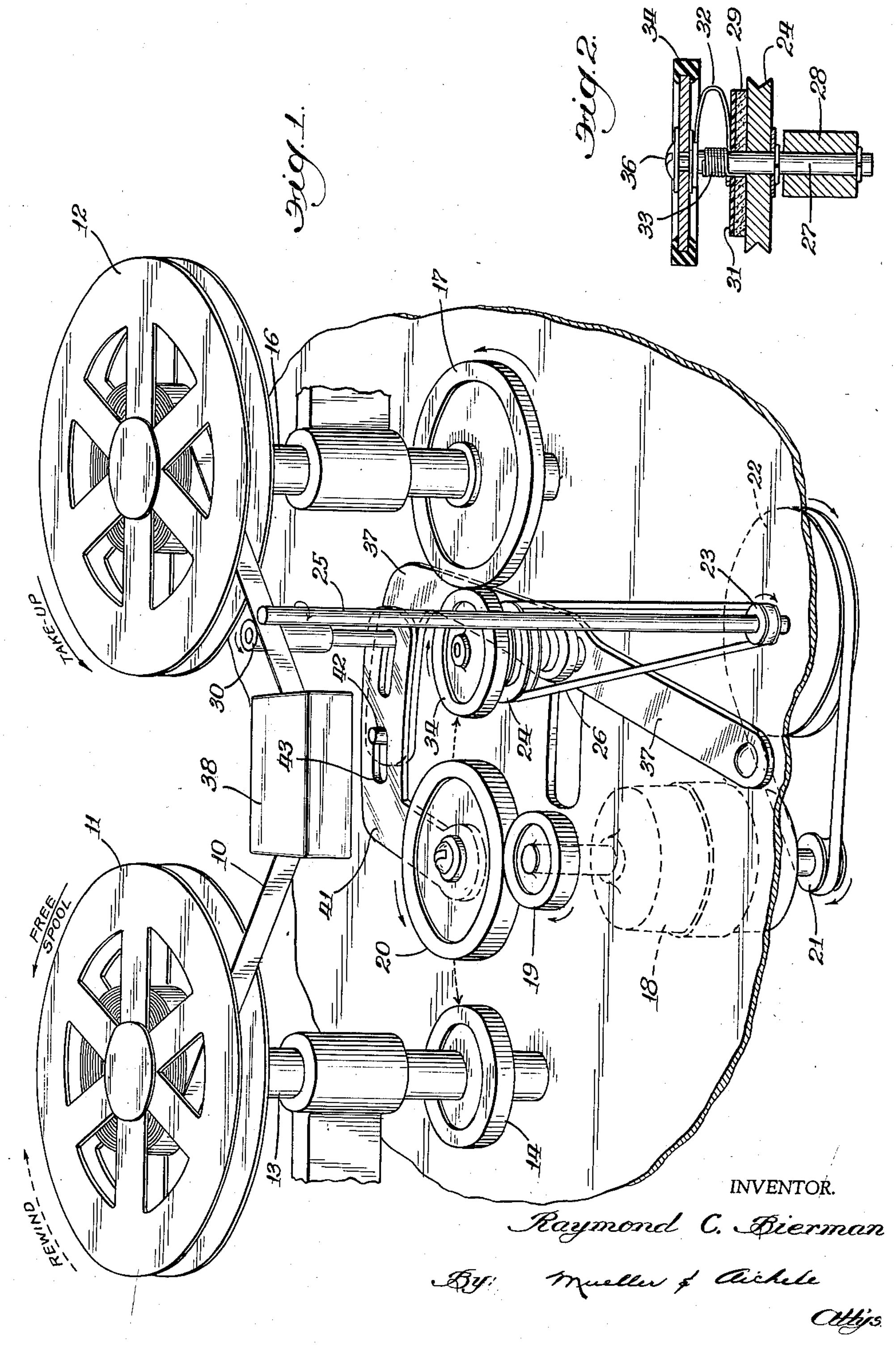

This invention relates to tape recorders and reproducers and more particularly to improved apparatus for driving the take-up reel of a tape recorder.

Devices for recording sound on magnetic tape and reproducing such include a let-off reel from which magnetic tape is fed and a take-up reel upon which the tape is wound. Such devices are referred to hereinafter as tape recorders for simplicity and this term includes apparatus performing both recording and reproducing functions. In the recording or play modes of operation, tape is unwound from the let-off reel at a constant linear velocity by a capstan-pressure roll combination past a recording or reproducing head and wound up on the take-up reel. Because the tape moves at a constant linear velocity, it is necessary that the speed of rotation of the take-up reel decrease gradually as the diameter of the tape roll upon the reel builds up. Therefore, it has been common to drive the take-up reel through a slipping clutch which includes a driven member, such as a pulley, slipping against a driving member which latter engages a take-up reel drum.

It is also desired to provide means for passing the tape from the let-off reel to the take-up reel at a more rapid rate as when a certain section of a recorder tape is to be skipped. This mode of operating a tape recorder is known as the fast forward mode and tape recorders are often operated in this way by bringing a second driving member against the take-up reel drum to rotate it at a faster rate.

The provision of the independent driving member for the fast forward mode is sometimes inconvenient in that the member occupies an undesirable amount of space and lever means must be provided for moving it into and out of contact with the take-up reel drum. In addition, driving a take-up reel drum in the fast forward mode will rotate the driven member of the slipping clutch and produce undesirable wear on the clutching member as well as imposing an additional load on the take-up reel. Alternatively, means must be provided for disengaging the clutch entirely from the take-up reel drum during the fast forward mode of operation which may require the use of additional parts and complicate the design of the recorder.

It is an object of this invention therefore to provide simple and compact driving apparatus for a take-up reel of a tape recorder.

It is another object to provide driving apparatus for the take-up reel of a tape recorder wherein the same driving member engages the take-up reel drum during both play and fast forward modes of operation.

It is a further object of the invention to provide driving apparatus for the take-up reel of the tape recorder which apparatus includes a slipping clutch not subjected to objectionable wear during the fast forward mode of operation.

A feature of the invention is the provision in a tape recorder of a driving member engaging a take-up reel drum during both play and fast forward modes of operation with the driving member being fixed to a shaft rotated through a coiled spring attached to one side of a slipping clutch arrangement. During the fast forward mode of operation, the driving member is driven directly and the shaft overrides the coiled spring thus effectively disengaging the driving member from the slipping clutch and avoiding undesirable wear between the clutch members.

Another feature of the invention is the provision in the driving means for the take-up reel of a tape recorder of the combination of a slipping clutch and an overriding spring clutch with the same rotating member serving as the driven member of the slipping clutch system and the driving member of the spring clutch system.

In the accompanying drawings:

Fig. 1 is a somewhat simplified perspective view showing let-off and take-up reels of a tape recorder and means for driving the same; and Fig. 2 is a view in vertical section of the driving means for the take-up reel drum.

In accordance with the invention, a take-up reel drum is driven in both play and fast forward modes by a driving member in the form of a wheel mounted for rotation with a shaft. A driven member in the form of a pulley is carried freely on the shaft and has a clutching disc secured to its one face. A second driven member is held against the clutching member and is connected to a clutch spring coiled around the shaft so that rotation of the second driven member through the clutch causes the spring to grip the shaft and turn it thereby rotating the driving member. The driving member bears against a take-up reel drum and during the play mode of operation rotates more slowly as a roll of tape builds up on the take-up reel because of the progressive slippage between the clutch and the second driven member. During the fast forward mode of operation another rotating drum is brought into engagement with the driving member to turn it at a faster rate which causes the shaft to override and turn inside the coiled spring thus unwinding it and effectively disengaging the two driven members from the driving member. The shaft rotates within the two driven members which now rotate together at the same rate of speed, there being no slippage between them. Thus, there is no objectionable wear on the clutch member during the high speed rotation of the driving member. This simplified arrangement permits the driving member to engage the take-up reel drum during both play and fast forward modes of operation and permits the effective performance of two driving functions by a single driving member.

Fig. 1 illustrates a web of magnetic tape 10 wound about a let-off reel 11 and a take-up reel 12. Let-off reel 11 is mounted on a spindle 13 carrying a let-off reel drum 14 at one end thereof. Similarly, take-up reel 12 is carried on a spindle 16 having take-up reel drum 17 at its one end.

Motor 18 turns the drum 19 in the direction indicated to rotate idler 20 and also rotates the pulley 21 which is belted to the flywheel 22. Pulley 23 carried on flywheel 22 is connected to the pulley 24 by the belt 26. Capstan 25 is turned by flywheel 22 and cooperates with pressure roll 30 to unwind tape from let-off reel 11. As more clearly shown in Fig. 2, the pulley 24 is carried freely on vertical shaft 27 which is journaled in the bearing 28. Felt ring 29 which serves as a clutching member is glued to one face of the pulley 24 and bears against the driven disc 31. An elliptical or cantilever type compression spring 32 presses the disc 31 against the clutching ring 29.

Coil spring 33 has one end connected to the disc 31 and is coiled about the shaft 27. The rubber edged wheel 34 is secured to one end of the shaft 27 as by means of the screw 36 and rotates with the shaft. The entire assembly illustrated in Fig. 2 is mounted on a lever arm 37 so that the wheel 34 can be moved into or out of engagement with the take-up reel drum 17. The linkage system illustrated also includes the slotted arm 41 carrying the idler 20 and movable with arm 37 through the action of projection 42 against the ends of slots 43. The arrangement shown is merely exemplary of means effective for moving the idler 20 and the wheel 34 to the positions effective for operating the recorder in the play, fast forward or rewind modes.

Fig. 1 shows the disposition of the various parts of the device when the recorder is being operated in the play mode to unwind the tape 10 at a constant linear speed from the let-off reel 11 between capstan 25 and pressure roll 30 past the transducer head contained in the housing 38. The driving wheel 34 is in engagement with the take-up reel drum 17. Rotation of the pulley 24 through the belt 26 causes rotation of the clutching member 29 and of disc 31 which tightens the spring 33 around the shaft 27 and rotates the shaft and the wheel 34. As a roll of tape begins to build up on the take-up reel 12, slippage occurs between the clutching member 29 and the disc 31 thus decreasing the rate of rotation of shaft 27 and the driving wheel 34. This slipping action is progressive as the tape roll builds up on the take-up reel 12 so that the constant linear tape velocity due to action of the capstan-pressure roll combination is maintained.

When it is desired to operate the tape recorder in the fast forward mode, the lever 37 is actuated to move the idler 20 into direct engagement with driving wheel 34 while maintaining contact with rotating drum 19. Direct driving of the wheel 34 causes the shaft 27 to override and slip within the clutch spring 33 causing it to unwind. This action effectively disengages the driven pulley 24 and the disc 31 from the driving wheel 34. Pulley 24 continues to rotate freely about the shaft 27 at a rate determined by the speed of belt 26. Since the disc 31 is disengaged from the load of the take-up reel 12 there is no tendency for it to slip with respect to clutching member 29 and it rotates with this member and the pulley 24. Thus, during the fast forward mode of operation there is no undesirable wear between disc 31 and clutching member 29. The amount of wear between shaft 27 and spring 33 is negligible.

When it is desired to operate the recorder in the rewind mode to move tape from the take-up reel 12 to the let-off reel 11, idler 20 (still driven by drum 19) is moved into engagement with let-off reel drum 14 and driving wheel 34 is moved out of engagement with take-up drum 17. Movement of lever arm 37 also moves pressure roll 30, which is carried thereon, out of engagement with the tape 10 thus releasing the tape from the pulling action of the rotating capstan and permitting rewind to take place.

In accordance with the arrangement described, the driving wheel 34 can be used to transmit torque to the take-up reel drum 17 during both the play and the fast forward mode of operation of the recorder. This eliminates the necessity for a separate fast forward driving wheel and permits a more compact design. Because of the effective disengagement between the driven members 24 and 31 and the driving wheel 34 during the fast forward mode of operation, there is negligible wear on the clutch member 29 and it is unnecessary to provide means for physically moving the clutch assembly during the transition from play to the fast forward mode of operation.

What is claimed is:

1. A tape recorder including in combination, a take-up reel drum, a driving member adapted to engage said drum during both play and fast forward modes of operation of said recorder, a rotatable shaft to which said driving member is fixed, a first driven member mounted freely on said shaft, a clutching member fixed to said first driven member, a second driven member mounted freely on said shaft, means urging said second driven member against said clutching member, a spring coiled around said shaft and connected at one of its ends to said second driven member so that the rotation of said second driven member causes said spring to grip said shaft and turn it and said driving member at the same speed as said second driven member, means for rotating said first driven member and a rotating drum for engaging said driving member to rotate it in the same direction as and at a faster rate than that of said second driven member.

2. Apparatus for driving a take-up reel of a tape recorder in both play and fast forward modes, including in combination, a rotatable shaft, a driving member secured to said shaft and rotatable therewith, a first driven member carried freely on said shaft, a clutching member engaging said first driven member, a second driven member mounted freely on said shaft, means urging said second driven member into frictional engagement with said clutching member, a spring connected at one of its ends to said second driven member adapted to grip said shaft and rotate the same upon rotation of said second driven member, means for rotating said first driven member at a first rate of speed during both play and fast forward modes of operating said recorder and means for directly driving said driving member at a second, higher rate of speed in the fast forward mode with said shaft adapted for rotation within said spring when said driving member is driven directly and with said first and second driven members rotating at the same rate as one another in the fast forward mode.

3. A tape recorder including in combination, a take-up reel, a take-up reel drum, a driving wheel adapted to engage said drum during both play and fast forward modes of operation of said recorder, a rotatable shaft to which said driving wheel is fixed, a pulley mounted freely on said shaft, a clutch ring fixed to one face of said pulley, a driven disc mounted freely on said shaft, means for holding said disc in frictional engagement with said clutch ring, means for rotating said pulley, said pulley and said disc rotating at different rates during the play mode of operation due to slippage of said ring and said disc, a spring connected to said disc at one end and coiled around said shaft in a direction to grip and rotate the same upon rotation of said disc, and rotating means adapted to engage said driving wheel during the fast forward mode of operation and rotate said wheel at a rate faster than its rate of rotation during the play mode with such rotation causing said shaft to slip within said spring and effectively disengaging said pulley and said disc from said take-up reel drum.

4. Reel driving apparatus adapted to wind a roll of material on a reel at both a fast and slow rate of feed wherein the rotational velocity of said reel is varied by means of a slipping clutch in order to maintain the slow rate of feed at a constant velocity, said apparatus including a combination, rotational driving means adapted to drive said reel, a constant speed power source, first power transmission means driven by said power source and adapted to selectively engage and drive said rotational driving means at the required velocity for producin the fast rate of feed, rotational control means adapted to selectively engage and feed the material to the reel with a constant velocity at the slow rate of speed, a slipping clutch including a driving member and a driven member, second power transmission means driven by said power source and adapted to continuously drive both said rotational control means and said driven member of said slipping clutch at the required velocity for producing the slow rate of speed, helical spring means connected to said driving member of said slipping clutch and adapted to grip and rotate said rotational driving means at substantially the same velocity as said driving member, said spring means releasing said rotational means upon rotation thereof by said first power transmission means whereupon said driving member and said driven member of said slipping clutch combination rotate at the same speed during said fast rate of feed.

5. A reel driving apparatus adapted to wind a roll of material on a reel at both fast and slow rates of feed including in combination, a rotatable shaft, a driving member affixed to said shaft and rotatable therewith, reel means driven by said driving member, a slipping clutch having a driven member freely rotatable on said shaft, said clutch including a grip spring having one end joined to said driven member to move therewith and coiled around said shaft in a direction so that rotation of said driven member in a given direction causes tightening of said spring about said shaft and rotation of said shaft and said driving member by said driven member, power driving means coupled to said driven member for turning the same at a slow rate of speed in the given direction and further power coupling means for selectively operating said driving member and said reel means by said power driving means at a fast rate of speed so that upon turning of said driving member and said shaft in the given direction said spring of said clutch may slip upon said rotatable shaft during operation at said fast rate of speed.

6. A tape recorder including in combination, a take-up reel, a rotatable driving member adapted to drive said reel during both play and fast forward modes of operation of said recorder, a rotatable shaft to which said driving member is fixed, a first driven member mounted freely on said shaft, a second driven member mounted freely on said shaft, at least one of said first and second members having a frictional surface facing the other of such members for frictional drive therebetween, spring means urging said first and second members against one another, a spring coiled around said shaft and connected at one of its ends to said second driven member so that the rotation of said second driven member causes said spring to grip said shaft and turn the same and said driving member at the same speed as said second driven member, power drive means for rotating said first driven member for the play mode of operation and disengageable means for driving said driving member to rotate the same in the same direction as, and at a faster rate than, that of said second driven member for the fast forward mode of operation, whereby said spring releases the grip thereof on said shaft to permit continued rotation of said first driven member.

References Cited in the file of this patent

UNITED STATES PATENTS

| | | |
|---|---|---|
| 1,676,558 | Jones | July 10, 1928 |
| 2,144,211 | Vollenweider | Jan. 17, 1939 |
| 2,217,183 | Ross | Oct. 8, 1940 |
| 2,705,599 | McCollough | Apr. 5, 1955 |
| 2,753,757 | Roth | July 10, 1956 |